Patented June 18, 1940

2,204,963

UNITED STATES PATENT OFFICE 2,204,963

CELLULOSE COATING SOLVENT COMPOSITION

Percy E. Joyce, Yokohama, Japan, assignor to Shell Development Company, San Francisco, Calif., a corporation of Delaware No Drawing. Application February 7, 1939, Serial No. 255,085. In France September 9, 1938

2 Claims. (Cl. 134—79)

There is great demand for a medium boiling solvent cheaper in cost and more universally available than normal butyl acetate and secondary amyl acetate, both of which are widely used in the formulation of cellulose coating compositions and thinners therefor.

It is an object of my invention to produce a substitute composition for these solvents which is more readily available and is equal or superior to those at present in use.

Briefly, I have found that blends of secondary butyl acetate and acetone condensation products in certain limited proportions, exhibit properties permitting them to be substituted for normal butyl acetate and/or secondary amyl acetate without change in the material balance of liquid coatings formulae containing them and will yield an equal or superior finished coating composition.

Although other acetone condensation products, as for example mesityl oxide, may be used, I prefer diacetone alcohol. Disadvantages of mesityl oxide in particular are its objectionable odor and toxicity. However, diacetone alcohol when used alone as a solvent has a very slow rate of evaporation, a poor dilution ratio with aliphatic hydrocarbon diluents, poor solvency for many of the more commonly used gums and resins and is incompatible with vegetable oils, such as castor oil, when mixed with cellulose solutions.

Secondary butyl acetate in itself has numerous undersirable properties for use as a solvent. A partial list would include its excessive evaporation rate, its poor blush resistance and the fact that in some cases its odor is considered objectionable.

As a result of experimentation I have discovered that mixtures of secondary butyl acetate and acetone condensation products, preferably diacetone alcohol, have a rate of evaporation, blush resistance, solvent power for cellulose esters, ethers, ether-esters and for natural and synthetic resins, as well as odor and non-toxicity favorably comparable to normal butyl acetate and secondary amyl acetate. When substituted in pigmented cellulose coating compositions, the commonly used pigments remain in suspension for the requisite period of time. For all practical purposes, in those cases where a cellulose coating composition or thinner formula calls for either normal butyl acetate or secondary amyl acetate, the solvent mixtures herein described may be substituted with advantage.

In the preferred form of my invention I use 85% by volume of secondary butyl acetate and 15% by volume of diacetone. While experiments indicate that this mixture is excellent for most purposes it should be realized that the solvent blend desirable for one type of application may not always be so for another. Climatic conditions may vary widely, and what would be considered as a satisfactory drying time by one user might quite likely be too fast or too slow for another. In such case the flexibility of the present invention may be utilized to compensate for such climatic variations. If the drying time is too slow, reduction of the diacetone content as low as to 5% by volume, with a corresponding increase in secondary butyl acetate content, may be resorted to in order to eliminate this difficulty. Conversely, the addition of more diacetone up to 30% by volume will slow down the evaporation rate and drying time. Exceeding these limits will be fatal to the counter-balancing of undesirable qualities previously mentioned.

SOLVENT POWER

Although, as previously mentioned, the cellulose derivative in the coating composition may be either an ester, an ether, or an ether-ester, the present invention is more particularly concerned with nitrocellulose lacquers and thinners for use in such lacquers.

The solvency of nitrocellulose in a solvent is usually measured by the tolerance of the solution to dilution with a non-solvent. A solution of nitrocellulose will tolerate the addition of a certain amount of non-solvent, after which further addition causes precipitation of the nitrocellulose. This limit of tolerance is expressed as the "dilution-ratio" and is numerically equal to the volume of diluent used divided by the volume of sample taken. There is as yet no standard method for carrying out this test, but the majority of solvent manufacturers and consumers are using the same basic scheme. The dilution ratio of the diacetone-secondary butyl acetate mixture and other comparable solvents with respect to two widely used lacquer diluents is shown in the following table:

Dilution ratios

| Solvent | Diluent | |
|---|---|---|
| | Toluene | Aromatic petroleum diluent (50% wt. arom.) |
| Vol. percent 15:85 diacetone secondary butyl acetate | 2.68 | 1.54 |
| Normal butyl acetate | 2.95 | 2.00 |
| Secondary amyl acetate | 2.14 | 1.60 |
| Secondary butyl acetate | 2.63 | 1.80 |
| Diacetone | 2.96 | 0.95 |

From this it may be seen that the dilution ratio of the claimed solvent composition compares favorably with normal butyl acetate and secondary amyl acetate.

Resins are added to nitrocellulose finishes to give gloss, hardness and adhesion to the film. The solvent mixtures described in this application have excellent solvent powers for numerous natural and synthetic resins used in lacquer manufacture. A partial list of those resins which are equally soluble in the present blends, includes natural dewaxed dammar, natural Manila copal, polystyrene chlorinated diphenyl and sulfonamide-formaldehyde.

The type of solvent affects the viscosity, or flowing property of finished lacquers. The viscosity of a nitrocellulose solution is generally regarded as a corollary of the solvent power of the liquid, thus liquids of high solvent power yield solutions of low viscosity and vice versa. Those solvents giving solutions of low viscosity are more economical for most purposes, requiring the use of less thinner for the same thickness of surface covering. The viscosity of solutions of one half and six grades of nitrocellulose (American Society for Testing Materials Designation: D 301-33), in the present solvent blends and in normal butyl acetate are very comparable, while similar solutions in secondary amyl acetate have higher viscosity, indicating that it is a less active solvent.

RATE OF EVAPORATION

The rate of evaporation is an important factor affecting the flow properties of lacquers and smoothness of the resulting film. Lacquers containing solvents of high volatility tend to form films which are uneven or pitted; solvents of low volatility, if present in excess, give films of uneven thickness. Normal butyl acetate and secondary amyl acetate have neither of these defects and produce smooth, well-levelled films. It is customary to refer the rate of evaporation of other liquids to that of normal butyl acetate. The ratio of the time of evaporation of a given volume of a liquid in question to the time of evaporation of an equal volume of normal butyl acetate under the same conditions is known as the relative rate of evaporation of the liquid. Values for the relative rate of less than one are slower and those greater than one faster evaporating than normal butyl acetate.

On this basis, normal butyl acetate has a relative rate of evaporation of 1.00, secondary amyl acetate of 0.80 and a diacetone:secondary butyl acetate::15:85% by volume mixture of 0.72. When the weight per cent of liquid evaporated was considered in view of the time of evaporation, it was noted that although the diacetone-secondary butyl acetate blend was initially more rapid evaporating, it actually remained in the film slightly longer than normal butyl acetate or secondary amyl acetate, giving films of equal smoothness. This is due to the fact that in the solvent blend the slower evaporating portion is the most effective in giving smooth films.

BLUSH RESISTANCE

Lacquers having low resistance to humidity may absorb water from the surrounding atmosphere causing partial precipitation in the drying film of either nitrocellulose or resin or both. Such an occurrence is known as "blushing" and is detrimental to the appearance and durability of the film. The cause of blushing has been variously described as being due to rapid evaporation of the solvent with cooling of the surrounding air to below its dew point, or to high solubility for water in the evaporating liquid. These causes are undoubtedly factors in blushing, but the more important factors may be the ability of the solvent to eliminate water faster than it can be imbibed and the tolerance of the nitrocellulose solution in that solvent for water. Diacetone is very slow evaporating but it is miscible with water in all proportions, whereas secondary butyl acetate is faster evaporating but has a limited solubility for water. Solutions of nitrocellulose in diacetone have better blush resistance than in normal butyl acetate and secondary amyl acetate, but secondary butyl acetate is inferior to all of these solvents. The mixtures of secondary butyl acetate and diacetone are equal or superior in blush resistance to either normal butyl acetate or secondary amyl acetate. When eight per cent solutions of nitrocellulose in the present blends are flow-coated and dried on glass panels in moving air having 85% relative humidity at 80° F., the resulting film is clear and has no blush. Similar solutions of nitrocellulose in normal butyl acetate and secondary amyl acetate dried under the same conditions are also clear and without blush. When the humidity is increased to 95%, however, the solvent mixtures described show less blush than either normal butyl acetate or secondary amyl acetate.

EXAMPLES

As typical examples of a lacquer and lacquer thinner formula containing the claimed solvent blend, the following are cited:

Wood lacquer

| | Pounds |
|---|---|
| ½ second nitrocellulose | 10 |
| 6 second nitrocellulose | 5 |
| Dewaxed dammar | 15 |
| Estergum | 10 |
| Blown castor oil | 7½ |
| Dibutyl phthalate | 7½ |
| Urea | ¼ |

Dissolved in 12 gals. of the following solvent:

| | Volume per cent |
|---|---|
| Methyl ethyl ketone | 15 |
| Isopropyl alcohol | 10 |
| Diacetone:secondary butyl acetate::15:85% by volume | 25 |
| Normal butyl alcohol | 10 |
| Toluol | 10 |
| Petroleum spirits | 30 |

*Spray lacquer thinner*

| | Volume per cent |
|---|---|
| Methyl ethyl ketone | 16 |
| Diacetone:secondary butyl acetate::15:85 | 20 |
| Secondary butyl alcohol | 10 |
| Aliphatic petroleum diluent | 50 |
| Isopropyl alcohol | 4 |

It should be understood, however, that in both of the above specific examples the amount of the diacetone:secondary butyl acetate mixture used may be varied as desired; it may be advantageous to use as little as 5% by volume of the total solvent content, or as conditions warrant, as much as 45% or more. Likewise, the ratio of diacetone to secondary butyl acetate in the mixture may be varied as previously disclosed.

I claim as my invention:

1. A pyroxylin coating composition comprising a solvent composition which contains a mixture consisting of 70 to 95 volume per cent secondary butyl acetate and from 5 to 30 volume per cent diacetone alcohol, said mixture comprising from 5 to 45 volume per cent of the total solvent content.

2. A pyroxylin coating composition comprising a solvent composition which contains a mixture consisting of substantially 85 volume per cent secondary butyl acetate and 15 volume per cent diacetone alcohol, said mixture comprising approximately 25 volume per cent of the total solvent composition.

PERCY E. JOYCE.